(12) United States Patent
Yamaoka (10) Patent No.: US 10,859,820 B2
(45) Date of Patent: Dec. 8, 2020

(54) HEAD-UP DISPLAY DEVICE (71) Applicant: DENSO CORPORATION, Kariya (JP)

(72) Inventor: Ryo Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 286 days.

(21) Appl. No.: 16/080,685

(22) PCT Filed: Jan. 27, 2017

(86) PCT No.: PCT/JP2017/002843
§ 371 (c)(1),
(2) Date: Aug. 29, 2018

(87) PCT Pub. No.: WO2017/150025
PCT Pub. Date: Sep. 8, 2017

(65) Prior Publication Data
US 2019/0064514 A1     Feb. 28, 2019

(30) Foreign Application Priority Data
Mar. 2, 2016  (JP) ................... 2016-040331

(51) Int. Cl.
*G02B 27/01*    (2006.01)
*B60K 35/00*    (2006.01)
(Continued)

(52) U.S. Cl.
CPC .............. *G02B 27/01* (2013.01); *B60K 35/00* (2013.01); *G09G 5/00* (2013.01); *G09G 5/10* (2013.01);
(Continued)

(58) Field of Classification Search
CPC  G02B 27/01; B60K 35/00; B60K 2350/2052; G09G 5/00; G09G 5/10; G09G 5/36; H04N 5/74
(Continued)

(56) References Cited

U.S. PATENT DOCUMENTS 7,403,639 B2 *  7/2008  Nagaoka ............... B60Q 9/008
                                                   382/104
2014/0267398 A1  9/2014  Beckwith et al.
(Continued)

FOREIGN PATENT DOCUMENTS

JP    H5-77679      3/1993
JP    H8-235376 A   9/1996
(Continued)

*Primary Examiner* — James R Greece
(74) *Attorney, Agent, or Firm* — Harness, Dickey & Pierce, P.L.C.

(57) ABSTRACT

A head-up display device is configured to project a display image in a vehicle onto a projection member that transmits an external real image to display the display image superimposed on the external real image for virtual image display visible to an occupant in the vehicle. A projection unit is configured to project a notification image as the display image for notifying the occupant of specific information onto the projection member. A display control unit is configured to control the projection unit to adjust a virtual image display state of the display image and to cut a virtual image display of specific pixels forming an inner portion inside an outer edge portion of the notification image.

8 Claims, 10 Drawing Sheets

(51) Int. Cl.
*G09G 5/36* (2006.01)
*H04N 5/74* (2006.01)
*G09G 5/00* (2006.01)
*G09G 5/10* (2006.01)

(52) U.S. Cl.
CPC ................ *G09G 5/36* (2013.01); *H04N 5/74* (2013.01); *B60K 2370/334* (2019.05)

(58) Field of Classification Search
USPC ........................................................ 359/630
See application file for complete search history.

(56) References Cited

U.S. PATENT DOCUMENTS

| | | | |
|---|---|---|---|
| 2014/0267402 A1* | 9/2014 | Hing .................... | G02B 27/01 345/633 |
| 2014/0268353 A1* | 9/2014 | Fujimura ............... | G02B 27/01 359/630 |
| 2014/0362195 A1 | 12/2014 | Ng-Thow-Hing et al. | |
| 2015/0103174 A1 | 4/2015 | Emura et al. | |
| 2016/0329028 A1* | 11/2016 | Simmons ........... | G02B 27/0172 |

FOREIGN PATENT DOCUMENTS

| | | |
|---|---|---|
| JP | H09035177 A | 2/1997 |
| JP | 2006284458 A | 10/2006 |
| JP | 2008136690 A | 6/2008 |
| JP | 2013079930 A | 5/2013 |
| JP | 2015068831 A | 4/2015 |
| JP | 2015096946 A | 5/2015 |
| JP | 2015120395 A | 7/2015 |
| JP | 2015166230 A | 9/2015 |
| WO | WO-2013046424 A1 | 4/2013 |

\* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2017/002843 filed on Jan. 27, 2017 and published in Japanese as WO/2017/150025 A1 on Sep. 8, 2017. This application is based on and claims the benefit of priority from Japanese Patent Application No. 2016-040331 filed on Mar. 2, 2016. The entire disclosures of all of the above applications are incorporated herein by reference.

TECHNICAL FIELD

The present disclosure relates to a head-up display device.

BACKGROUND ART

Conventionally, a head-up display device (HUD device) has been widely known, which projects a display image in a vehicle onto a projection member, which transmits an external real image, to display the display image superimposed on the external real image for virtual image display visible to an occupant in the vehicle.

As a type of the HUD device described above, disclosed in Patent Literature 1, a projection of a display image in a device that is superimposed on an external real image for virtual image display in order to notify an occupant in a vehicle of information is controlled by a navigation apparatus to adjust a virtual display state of the display image. The device disclosed in Patent Literature 1 contemplates a control that enables a visibility of the external real image to be enhanced by increasing an overall transparency of the display image.

However, in case the transparency of the display image is increased as a whole, the visibility of the display image per se becomes naturally low. As a result, notification property of the information by the display image may be degraded.

PRIOR TECHNICAL LITERATURE

Patent Literature

PATENT LITERATURE 1: JP 2006-284458 A

SUMMARY OF INVENTION

It is an object of the present disclosure to provide an HUD device configured to ensure compatibility between a visibility of an external real image and a notification property of information by a display image.

According to one aspect of the present disclosure, a head-up display device is configured to project a display image onto a projection member, which is configured to transmit an external real image, to display the display image superimposed on the external real image to indicate a virtual image visible to an occupant in the vehicle. The head-up display device comprises a projection unit configured to project a notification image as the display image onto the projection member to notify the occupant of specific information. The head-up display device further comprises a display control unit configured to control the projection unit to adjust a virtual image display state of the display image to cut specific pixels, which form an inner portion inside an outer edge portion of the notification image, in a virtual image display.

BRIEF DESCRIPTION OF THE DRAWINGS

The above and other objects, features and advantages of the present disclosure will become more apparent from the following detailed description made with reference to the accompanying drawings. In the drawings.

The above-described object and another object, features, or advantages of the present disclosure will become more obvious through the specific description below with reference to the accompanying figures. In the drawings.

DESCRIPTION OF EMBODIMENTS

Hereinafter, description will be given of the multiple embodiments of the present disclosure based on the drawings. The same reference numerals are assigned to the corresponding elements in the embodiments, and overlapping descriptions thereof may be omitted. When only a portion of a configuration in each embodiment is described, with respect to other portions of the configuration, configurations of other embodiments described in advance can be applied. In addition to the combinations of configurations clearly depicted in the explanation of the embodiments, as long as problems do not particularly arise in a combination, the configurations of multiple embodiments may be partially combined with each other, even when not clearly described.

First Embodiment

Figure 1:
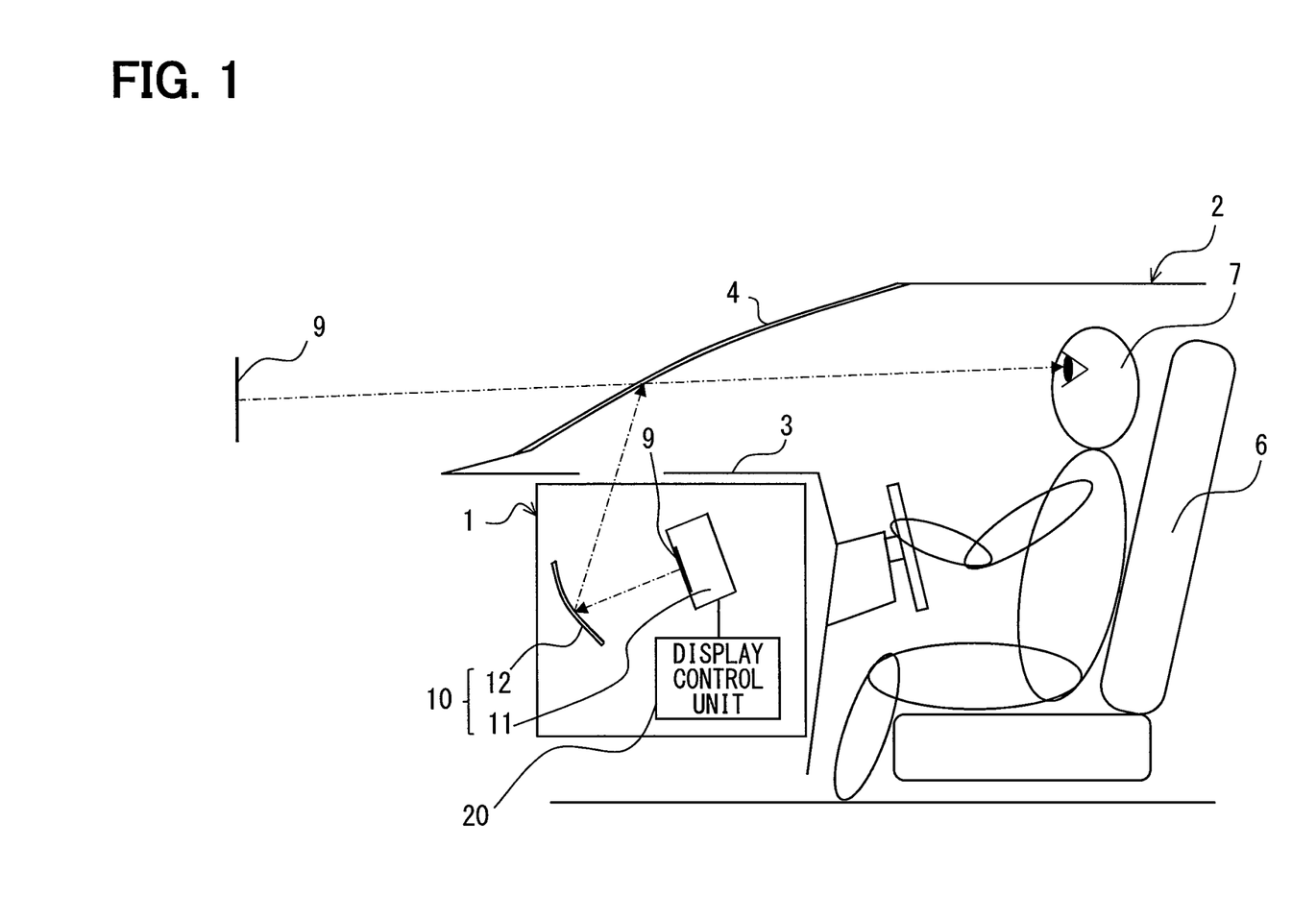
FIG. 1 is a configuration diagram showing an HUD device according to a first embodiment.

As shown in FIG. 1, an HUD device 1 according to a first embodiment of the present disclosure is mounted on a vehicle 2. The HUD device 1 includes a projection unit 10 and a display control unit 20. Incidentally, a vertical direction and a lateral direction in FIGS. 1 and 2 substantially coincide with the vertical direction and the horizontal direction of the vehicle 2 on a horizontal plane.

The projection unit 10 is accommodated in an instrument panel 3 in the interior of the vehicle 2. The projection unit 10 has a projector 11 and an optical system 12. The projector 11 is, for example, a liquid crystal type or scanning type projector. In the present embodiment, the projector 11 forms and displays a color display image 9. The optical system 12 includes at least one optical member such as a reflecting mirror. The optical system 12 guides a light flux of the display image 9 projected from the projector 11 to outside the instrument panel 3 by reflection or the like, for example.

In this manner, the light flux is guided by the optical system 12 as indicated by one-dot chain lines in FIG. 1 so that the display image 9 is projected onto a front windshield 4 of the vehicle 2. In this example, the front windshield 4, which is made of a light transmissive glass as a "projection member," reflects the light flux of the projected display image 9 and transmits a light flux of an external real image 5 existing outside and in front of the vehicle 2.

Therefore, the light flux of the display image 9 reflected by the front windshield 4 and the light flux of the external real image 5 transmitted through the front windshield 4 are incident on pupils of an occupant 7 who is seated on a driver's seat 6 in the vehicle 2. As a result, a virtual image of the display image 9 to be imaged ahead of the front windshield 4 out of the vehicle 2 is visually recognized on a driver's seat 6 side with respect to the external real image 5 by the occupant 7. In other words, in the present embodiment, the display image 9 on which the external real image 5 is superimposed on the driver's seat 6 side is displayed as the virtual image visible to the occupant 7.

Figure 2:
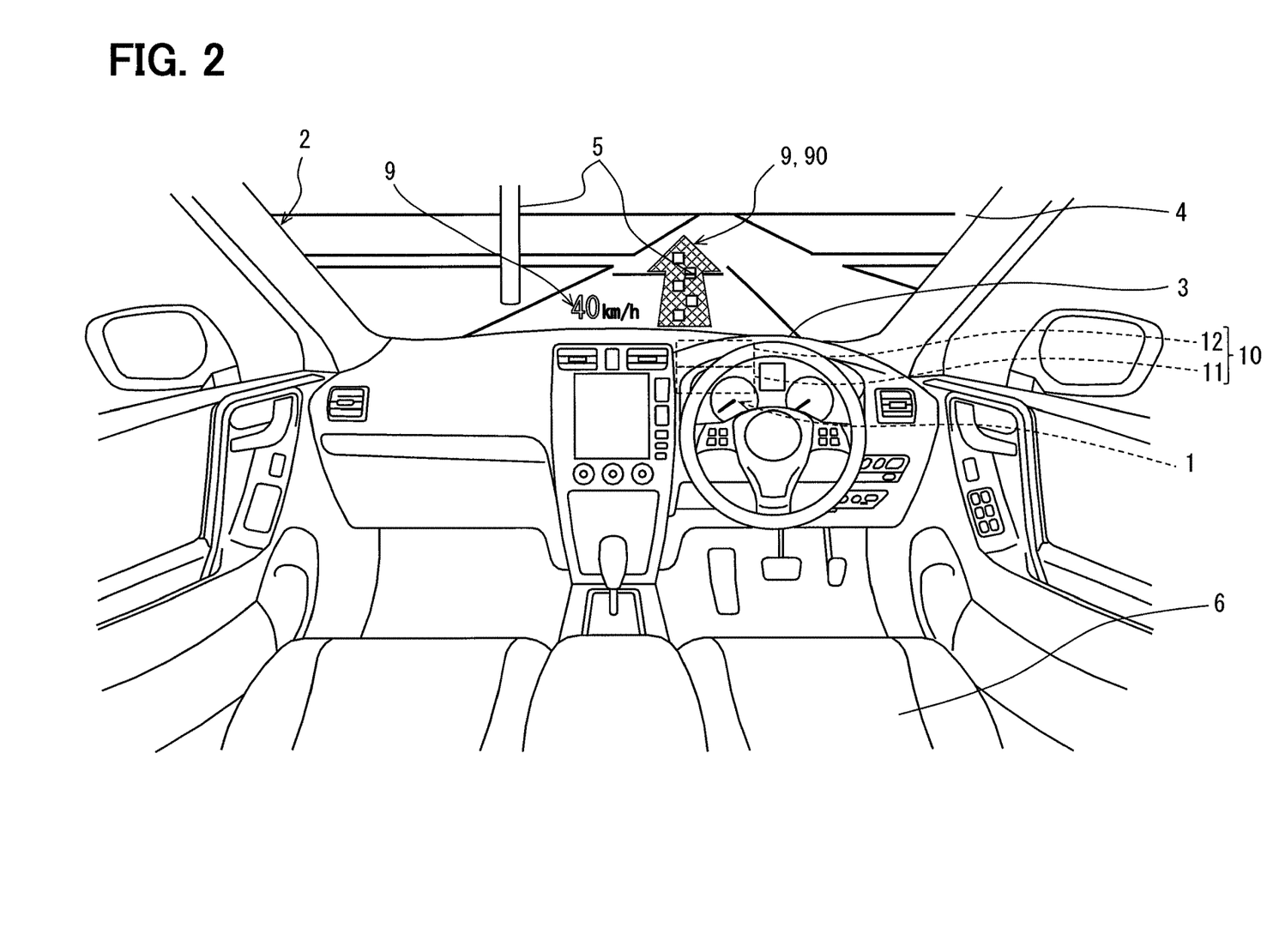
FIG. 2 is a front view showing a virtual image display state by the HUD device according to the first embodiment.

The display image 9 thus displayed as the virtual image fulfills a notifying function to notify the occupant 7 of predetermined information in the vehicle 2. As notification information by the display image 9, for example, instrument information such as a vehicle speed, traffic sign information such as a speed limit sign, warning information such as over speed warning, communication information on telephones or mails, path information such as turn by turn, and the like are cited. In this example, in particular, the path information is employed as "specific information" which has little influence on compliance with traffic regulations. In other words, in the present embodiment, as shown in FIG. 2, the display image 9 for notifying the path information is set as the notification image 90.

As shown in FIG. 1, the display control unit 20 is accommodated in the instrument panel 3 in the vehicle 2 together with the projection unit 10. The display control unit 20 is mainly configured by a microcomputer and an image processing circuit. The display control unit 20 is electrically connected to at least the projector 11 of the projection unit 10. At the same time, the display control unit 20 is connected to electrical components required for a virtual image display, for example, another display control unit, a sensor, and so on of the vehicle 2 in a communicatable manner. The display control unit 20 controls the projection unit 10 based on signals from the connected electrical components. As a result, the display control unit 20 adjusts a virtual image display state of the display image 9 including a notification image 90.

Hereinafter, a display state adjustment of the notification image 90 by the display control unit 20 controlling the projection unit 10 will be described in detail. The display control unit 20 forms the notification image 90 from normal pixels 90a and specific pixels 90b as shown in FIG. 3.

Figure 3:
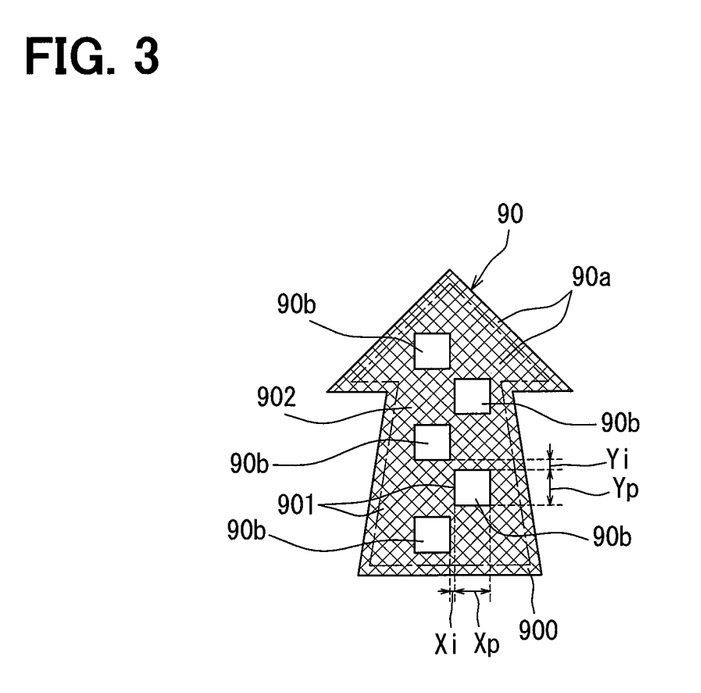
FIG. 3 is a front view showing a notification image displayed as a virtual image by the HUD device according to the first embodiment.

The normal pixels 90a are set to a predetermined number of pixels forming an outline of an outer shape as an outer edge portion 900 on an outside of a one-dot chain line in a cross-hatched portion of the notification image 90 in FIG. 3. At the same time, the normal pixels 90a are also set to a predetermined number of pixels forming a remaining part 902, except for the specific pixels 90b, as an inner portion 901 inside the one-dotted chain line in the cross-hatched portion of the notification image 90 in FIG. 3, that is, inside the outer edge portion 900.

Figure 4:
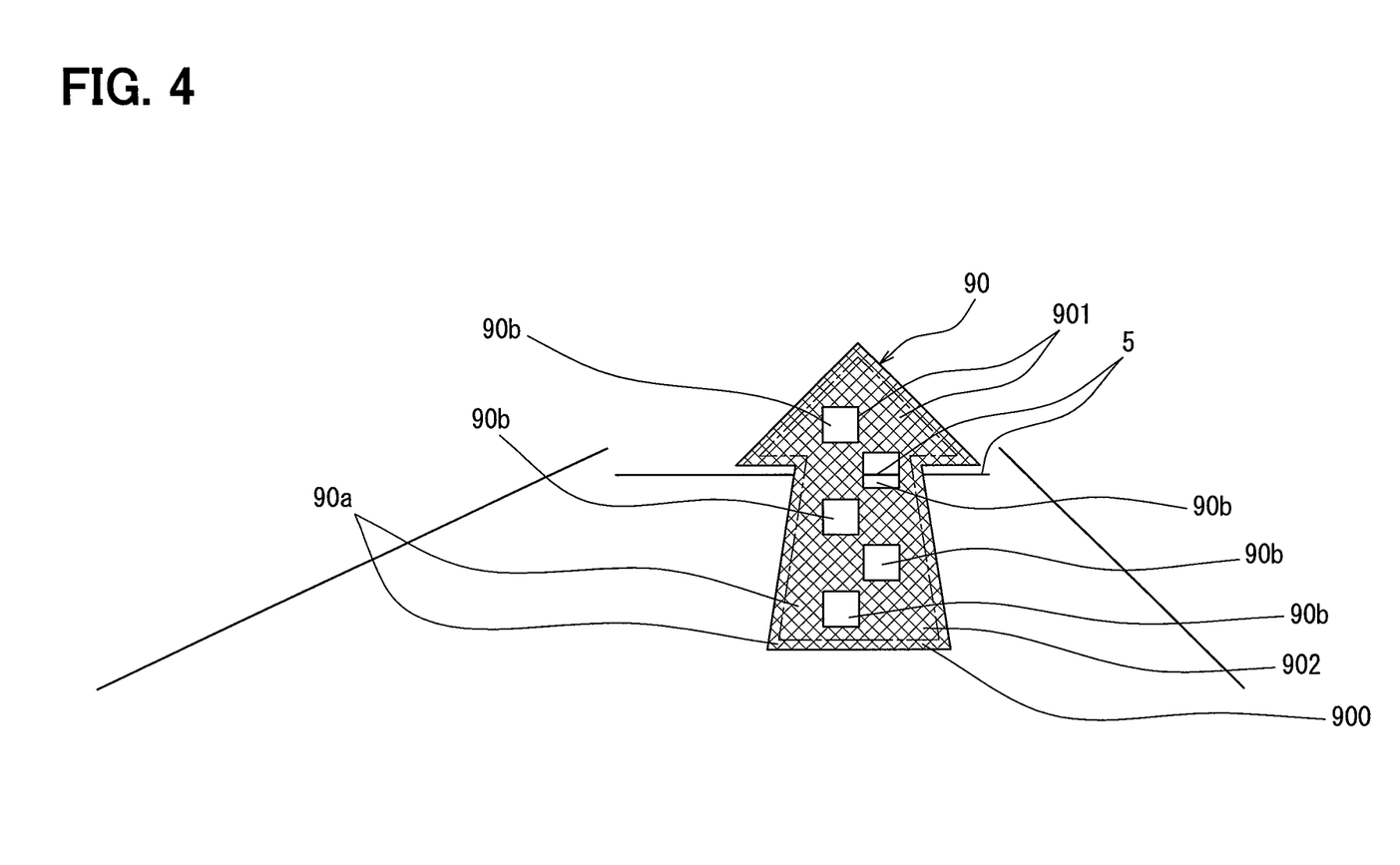
FIG. 4 is a front view showing a superimposed state of the notification image displayed as the virtual image by the HUD device on an external real image according to the first embodiment.

A contrast ratio of enhancing the visibility of the external real image 5 superimposed as shown in FIG. 4 is imparted to the normal pixels 90a forming the outer edge portion 900 and the remaining part 902 of the inner portion 901 except for the specific pixels 90b in the notification image 90 as described above. Therefore, the display control unit 20 forms the normal pixels 90a with a color tone of relatively high luminance such as white where each gradation value of RGB is the maximum value, for example.

On the other hand, the specific pixels 90b are set to a predetermined number of pixels at each of multiple places where the normal pixels 90a are not set in the inner portion 901 of the notification image 90, as indicated by outlined squares in FIG. 3. As described above, the virtual image display is cut in the specific pixels 90b at the multiple places in the inner portion 901 of the notification image 90 so that the external real image 5 superimposed as shown in FIG. 4 is substantially transmitted as it is as shown in FIG. 4. As a result, the notification image 90 realizes visibility as if it is translucent in a pseudo manner. Therefore, the display control unit 20 forms the specific pixels 90b at all of the places, for example, with zero luminance where each gradation value of RGB becomes the minimum value.

In this example, the multiple places of the specific pixels 90b appearing in the inner portion 901 of the notification image 90 are placed in a regular checkered pattern. Therefore, the display control unit 20 adjusts an outer shape of the specific pixels 90b at each place, which is determined according to a placement mode of the component pixels to substantially the same shape. At the same time, the display control unit 20 adjusts a lateral outer size Xp and a lateral placement interval Xi of the specific pixels 90b at each place, which are determined according to the number of placement of the component pixels, to respective substantially constant dimensions. Likewise, the display control unit 20 adjusts an outer size Yp in a vertical direction and a placement interval Yi in the vertical direction of the specific pixels 90b at each place, which are determined according to the number of placement of the component pixels, to respective substantially constant dimensions. In consideration of the above, particularly according to the present embodiment, the specific pixels 90b at each place are formed with a square shape whose outer sizes Xp and Yp are substantially the same dimensions so that a total area of the specific pixels 90b at each place occupies, for example, a proportion of about 20 to 70% in an entire area of the notification image 90.

According to the first embodiment described above, in the notification image 90 displayed as the virtual image superimposed on the external real image 5 for the purpose of notifying the occupant 7 in the vehicle 2 of information, the virtual image display of the specific pixels 90b forming the inner portion 901 inside the outer edge portion 900 is cut. As a result, in the notification image 90, the external real image 5 is substantially transmitted as it is at the specific pixels 90b where the virtual image display is cut in the inner portion 901, while a high-visibility contrast ratio to the external real image 5 can be imparted to the outer edge portion 900 and the inner portion 901 except for the specific pixels 90b. This makes it possible to ensure compatibility between the visibility of the external real image 5 and the notification property of information by the notification image 90.

In addition, according to the first embodiment, the specific pixels 90b in which the virtual image display is cut appears at the multiple places in the inner portion 901 of the notification image 90, as a result of which the number of places where the external real image 5 is substantially transmitted as it is increases. Therefore, while ensuring the visibility of the external real image 5, the high-visibility contrast ratio to the external real image 5 is imparted to the outer edge portion 900 of the notification image 90 and the inner portion 901 except for the specific pixels 90b to enable the notification property of information to be ensured.

Furthermore, according to the first embodiment, the multiple places where the specific pixels 90b where the virtual image display is cut appear are arranged in a checkered pattern at the inner portion 901 of the notification image 90. According to the regular arrangement of the checkered pattern, image processing for forming the notification image 90 can be simplified, and a responsiveness of displaying the virtual image of the notification image 90 can be enhanced.

Second Embodiment

A second embodiment of the present disclosure is a modification of the first embodiment. According to the second embodiment, multiple places at which specific pixels 2090b indicated by outlined squares in FIG. 5 appear on an inner portion 901 of a notification image 2090 are arranged at random. In the second embodiment described above, an outer shape of the specific pixels 2090b at each place, which is determined according to a placement mode of the component pixels, is adjusted to a similar shape by the display control unit 20. At the same time, a lateral outer size Xp and a lateral placement interval Xi of the specific pixels 2090b at each place, which are determined according to the number of placement of the component pixels, are adjusted to respective different dimensions by the display control unit 20. Further, an outer size Yp in a vertical direction and a placement interval Yi in the vertical direction of the specific pixels 2090b at each place, which are determined according to the number of placement of the component pixels, are adjusted to respective different dimensions by the display control unit 20. The details of the specific pixels 2090b other than those described above are substantially the same as those of the specific pixels 90b described in the first embodiment.

Figure 5:
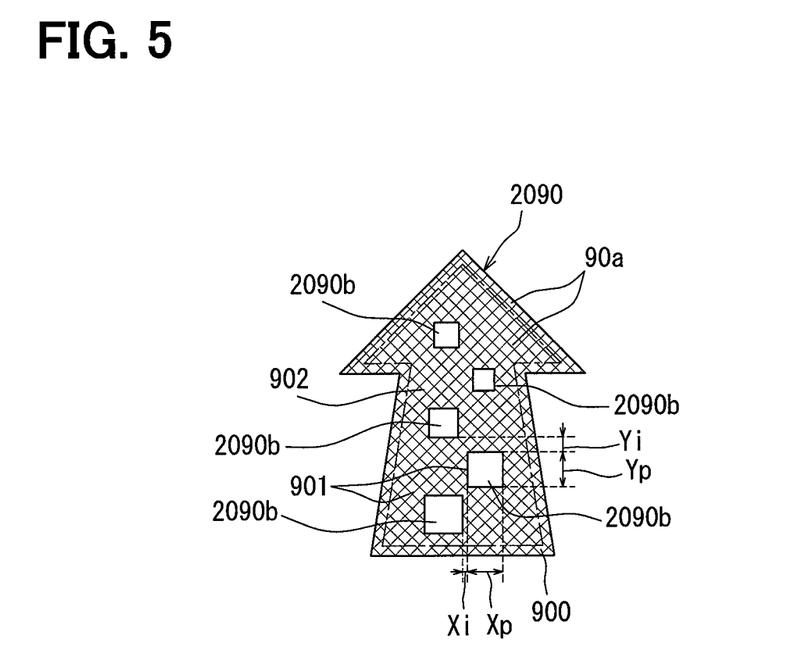
FIG. 5 is a front view showing a notification image displayed as a virtual image by an HUD device according to a second embodiment, In FIG. 6, (a) to (e) are front views showing a superimposed state of a notification image displayed as a virtual image by the HUD device on an external real image every time according to a third embodiment, In FIG. 7, (a) to (e) are front views showing a superimposed state of a notification image displayed as a virtual image by the HUD device on an external real image every time according to a fourth embodiment, In FIG. 8, (a) to (e) are front views showing a superimposed state of a notification image displayed as a virtual image by the HUD device on an external real image every time according to a fifth embodiment.

According to the second embodiment described above, the multiple places at which the specific pixels 2090b where the virtual image display is cut appear are arranged at random in the inner portion 901 of the notification image 2090. With the random arrangement described above, the deterioration in visibility such as moiré caused by regular arrangement of the specific pixels 2090b can be reduced. In addition, when the sizes of the multiple places at which the specific pixels 2090b appear are different from each other, the effect of reducing the deterioration of visibility such as moiré increases.

Third Embodiment

Figure 6:
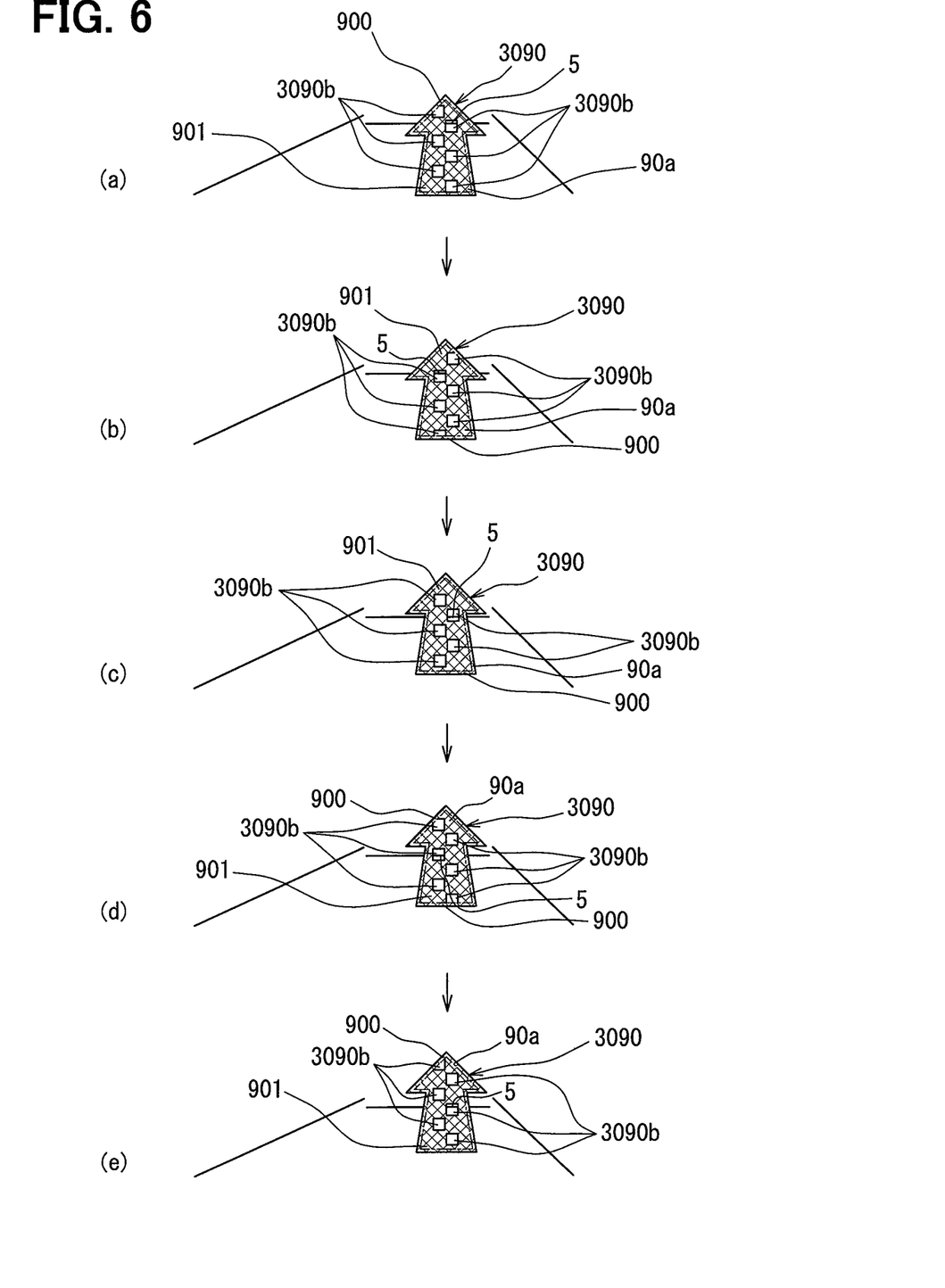

A third embodiment of the present disclosure is a modification of the first embodiment. According to the third embodiment, multiple places at which specific pixels 3090b indicated by outlined squares in (a) to (e) in FIG. 6 appear on an inner portion 901 of a notification image 3090 are displaced with time. In particular, in the third embodiment, the specific pixels 3090b at each place is displaced from a lower side toward an upper side in the inner portion 901 in a virtual image display state, to thereby realize a frame animation moving in a traveling direction of the vehicle 2.

In the third embodiment described above, the specific pixels 3090b in each place are formed by the display control unit 20 in a moving image form in which the component pixels decrease from the lower side and increase upward for each frame. However, in the vicinity of a boundary between the inner portion 901 and the lower outer edge portion 900 shown in (b) to (d) in FIG. 6, the specific pixels 3090b are formed in a moving image state in which the component pixels increase upward from the boundary for each frame. On the other hand, in the vicinity of a boundary between the inner portion 901 and the upper outer edge portion 900 shown in (a), (d) and (e) in FIG. 6, the specific pixels 3090b are formed in a moving image state in which the component pixels decrease downward from the boundary for each frame. The details of the specific pixels 3090b other than those described above are substantially the same as those of the specific pixels 90b described in the first embodiment.

According to the third embodiment described above, the places at which the specific pixels 3090b where the virtual image display is cut appear are displaced in the inner portion 901 of the notification image 3090 with time. According to the above configuration, since the places at which the specific pixels 3090b appear are displaced with time as places at which the external real image 5 is transmitted as it is, discrimination of the external real image 5 shown in (a) to (e) in FIG. 6 can be enhanced while the notification property of the information by the notification image 3090 is ensured.

Fourth Embodiment

A fourth embodiment of the present disclosure is a modification of the first embodiment. Increasing and decreasing luminance of normal pixels 4090a are repeated for a notification image 4090 with a change in line spacing cross-hatched in (a) to (e) in FIG. 7 every time according to the fourth embodiment. In particular, in the fourth embodiment, a frame animation is realized in which the luminance of the virtual image display of the normal pixels 4090a is alternately switched between a normal luminance Lh on a higher luminance side and a changed luminance Ll on a lower luminance side. In this example, a ratio between the number of frames at the time of the higher luminance and the number of frames at the time of the lower luminance is set to, for example, 1:1, 2:1, 3:1 or the like so as to prevent the occupant 7 from feeling flickering at the time of visual recognition.

Figure 7:
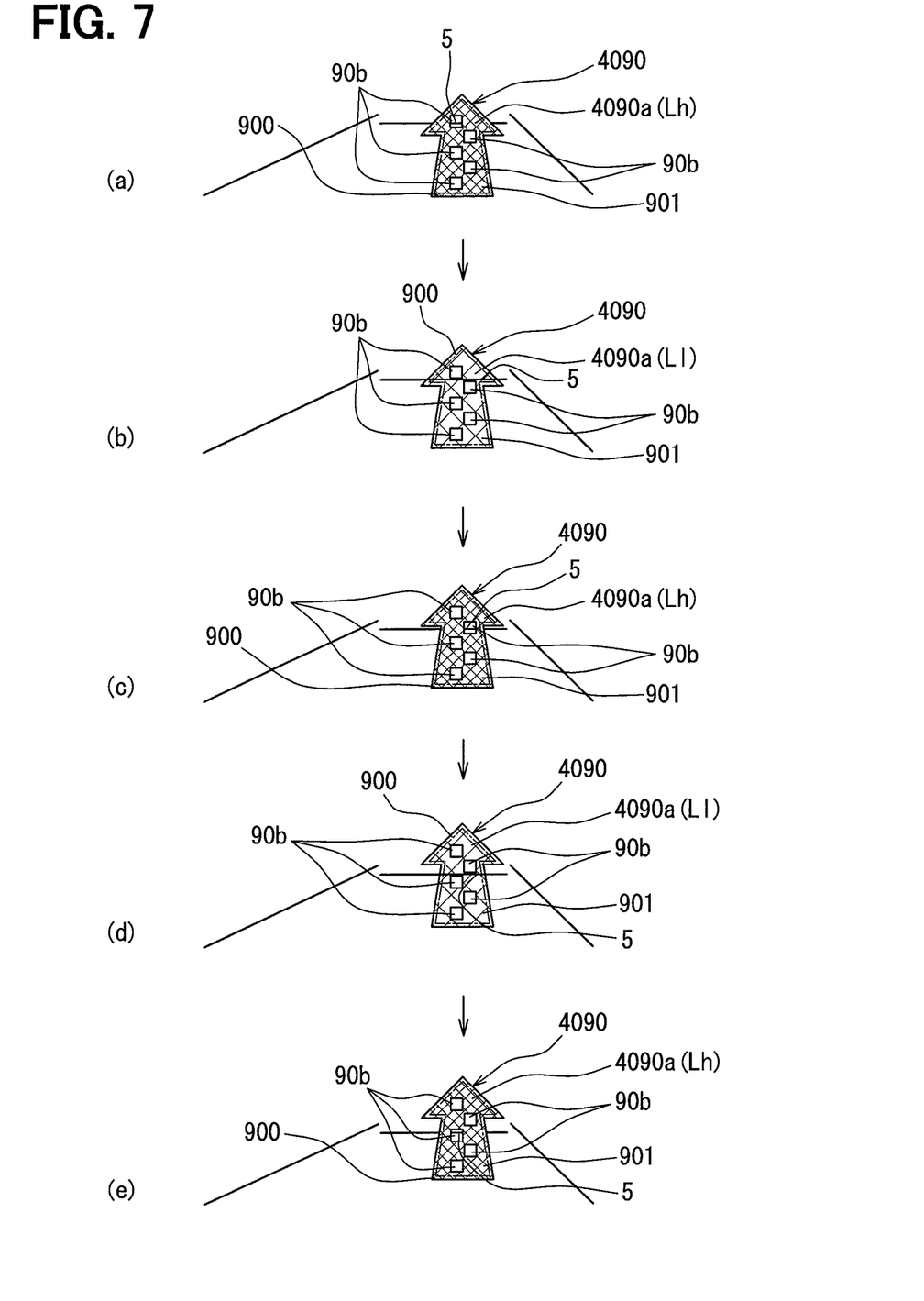

In the fourth embodiment described above, for the purpose of imparting a contrast ratio high in the visibility to the external real image 5, the normal pixels 4090a at the time of the higher luminance shown in (a), (c), and (e) in FIG. 7 are formed by the display control unit 20, for example, with a color tone of the normal luminance Lh such as white where each gradation value of RGB is the maximum value. On the other hand, for the purpose of allowing visual recognition of the external real image 5 to be superimposed at a place adjacent to a portion transmitted through the specific pixels 90b, the normal pixels 4090a at the time of the lower luminance shown in (b) and (d) in FIG. 7 are formed by the display control unit 20, for example, with the color tone of the changed luminance L1 such as gray where each gradation value of RGB is an intermediate value. The details of the normal pixels 4090a other than those described above are substantially the same as those of the normal pixels 90a described in the first embodiment.

According to the fourth embodiment as described above, the increasing and decreasing of the luminance of the virtual image display are repeated for the normal pixels 4090a forming the outer edge portion 900 and the inner portion 901 except for the specific pixels 90b in the notification image 4090. In this example, the contrast ratio with the high visibility can be imparted to the external real image 5 substantially transmitted through the specific pixels 90b as it is in the normal pixels 4090a at the time of the higher luminance in which the luminance of the virtual image display is high. On the other hand, the external real image 5 of a portion which is adjacent to a portion substantially transmitted through the specific pixels 90b as it is and superimposed with the normal pixels 4090a is visually recognized as shown in (b) and (d) in FIG. 7 at the time of the lower luminance in which the luminance of the virtual image display of the normal pixels 4090a is low. As described above, while the notification property of the information by the notification image 4090 is maintained by the normal pixels 4090a at the time of the higher luminance, the visibility of the external real image 5 can be enhanced by the specific pixels 90b always cut and the normal pixels 4090a at the time of the lower luminance.

Fifth Embodiment

A fifth embodiment of the present disclosure is a modification of the fourth embodiment. In a notification image 5090 according to the fifth embodiment shown in (a) to (e) in FIG. 8 every time, as in the fourth embodiment, the increasing and decreasing of the luminance of the virtual image display are repeated for the normal pixels 5090a, but the changed luminance L1 on the low luminance side becomes zero luminance L0. As a result, since the normal pixels 5090a at the time of the lower luminance come to a state of cutting the virtual image display together with the specific pixels 90b, the frame animation disappearing intermittently as the entire notification image 5090 is realized. (b) and (d) in FIG. 8 show a state in which the virtual image display of the normal pixels 5090a and the specific pixels 90b is cut by two-dot chain lines in a pseudo manner.

Figure 8:
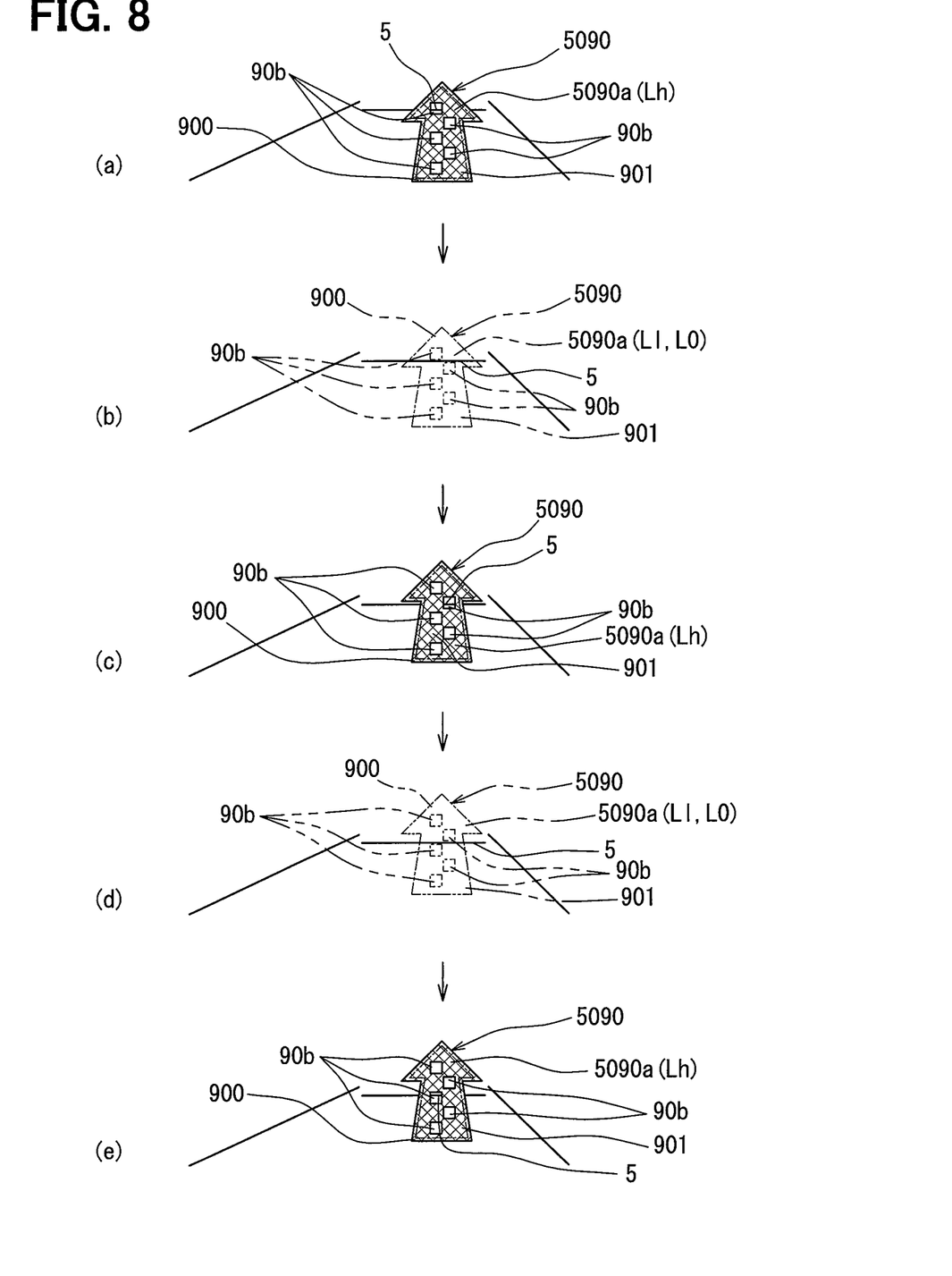

In the fifth embodiment described above, for the purpose of allowing the transmission of the external real image 5 to be superimposed even at a place adjacent to a portion transmitted through the specific pixels 90b, the normal pixels 5090a at the time of the lower luminance shown in (b) and (d) in FIG. 8 are formed by the display control unit 20, for example, with the zero luminance L0 where each gradation value of RGB is the minimum value. As shown in (a), (c), and (e) in FIG. 8, the normal pixels 5090a at the time of the higher luminance are formed by the display control unit 20 with the color tone of the normal luminance Lh similar to that of the fourth embodiment. In addition, the details of the normal pixels 5090a other than those described above are substantially the same as those of the normal pixels 90a described in the first embodiment.

According to the fifth embodiment described above, the luminance of the virtual image display of the normal pixels 5090a in the notification image 5090 is alternately switched between the normal luminance Lh on the higher luminance side and the zero luminance L0 that is the changed luminance L1 on the lower luminance side. In this example, the contrast ratio with the higher visibility can be imparted to the external real image 5 substantially transmitted through the specific pixels 90b as it is in the normal pixels 5090a at the time of the higher luminance in which the luminance of the virtual image display is switched to the normal luminance Lh. On the other hand, as with the specific pixels 90b, in the normal pixels 5090a at the time of the lower luminance in which the virtual image display is cut by switching the luminance of the virtual image display to the zero luminance L0 on the lower luminance side, as shown in (b) and (d) in FIG. 8, the external real image 5 can be substantially transmitted as it is and visually recognized. As described above, while the notification property of the information by the notification image 5090 is maintained by the normal pixels 5090a at the time of the higher luminance, the visibility of the external real image 5 can be surely enhanced by the specific pixels 90b always cut and the normal pixels 5090a at the time of the lower luminance.

Other Embodiments

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

Figure 9:
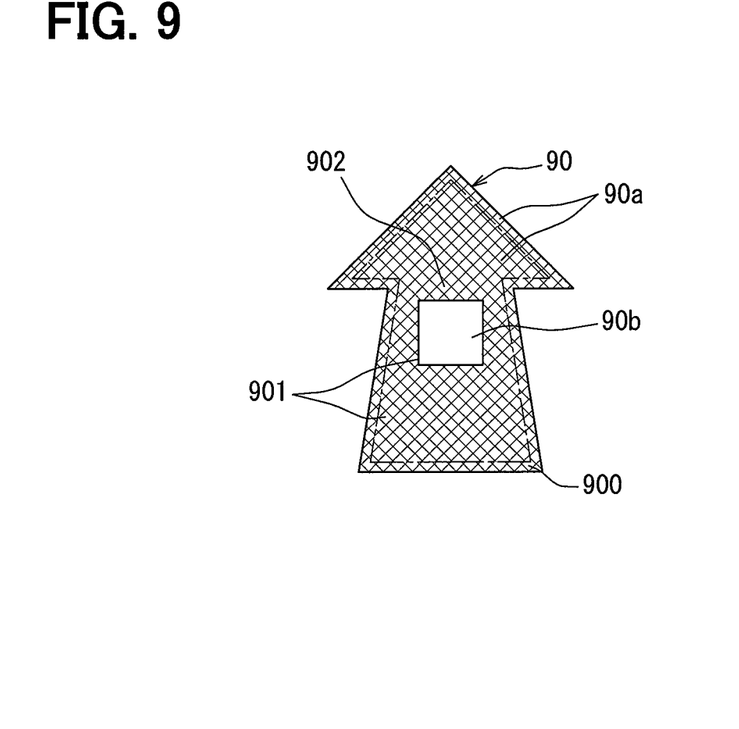
FIG. 9 is a front view illustrating a modification of FIG. 3.

As Modification 1 related to the first and third to fifth embodiments, as shown in FIG. 9, the specific pixels 90b and 3090b in the notification images 90, 3090, 4090, and 5090 may be formed only in one place. Incidentally, FIG. 9 shows Modification 1 of the first embodiment as a representative.

Figure 10:
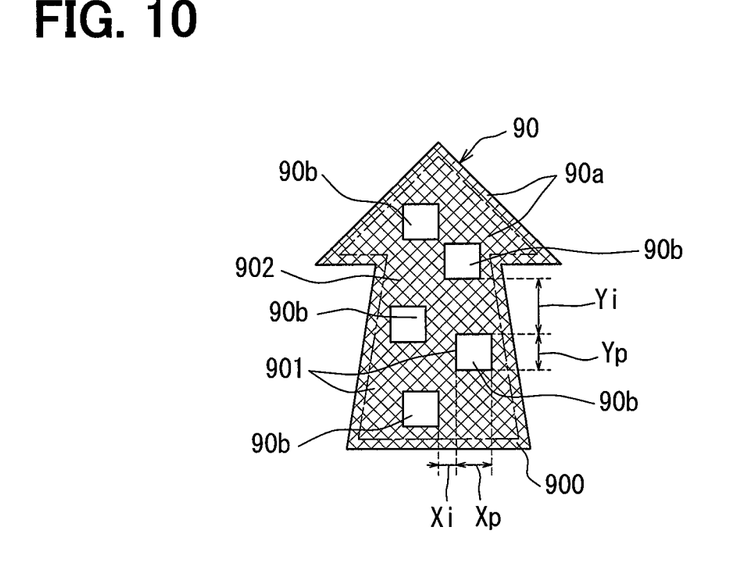
FIG. 10 is a front view illustrating a modification of FIG. 5, and In FIG. 11, (a) to (e) are front views illustrating a modification of FIG. 6.

As Modification 2 related to the second embodiment, as shown in FIG. 10, the specific pixels 2090b at multiple places in the notification image 2090 may be adjusted such that the outer sizes Xp and Yp are kept substantially constant in each of the vertical direction and the lateral direction, and may be arranged at random. In Modification 2 described above, the placement intervals Xi and Yi are different from each other in the vertical direction and the lateral direction, respectively.

Figure 11:
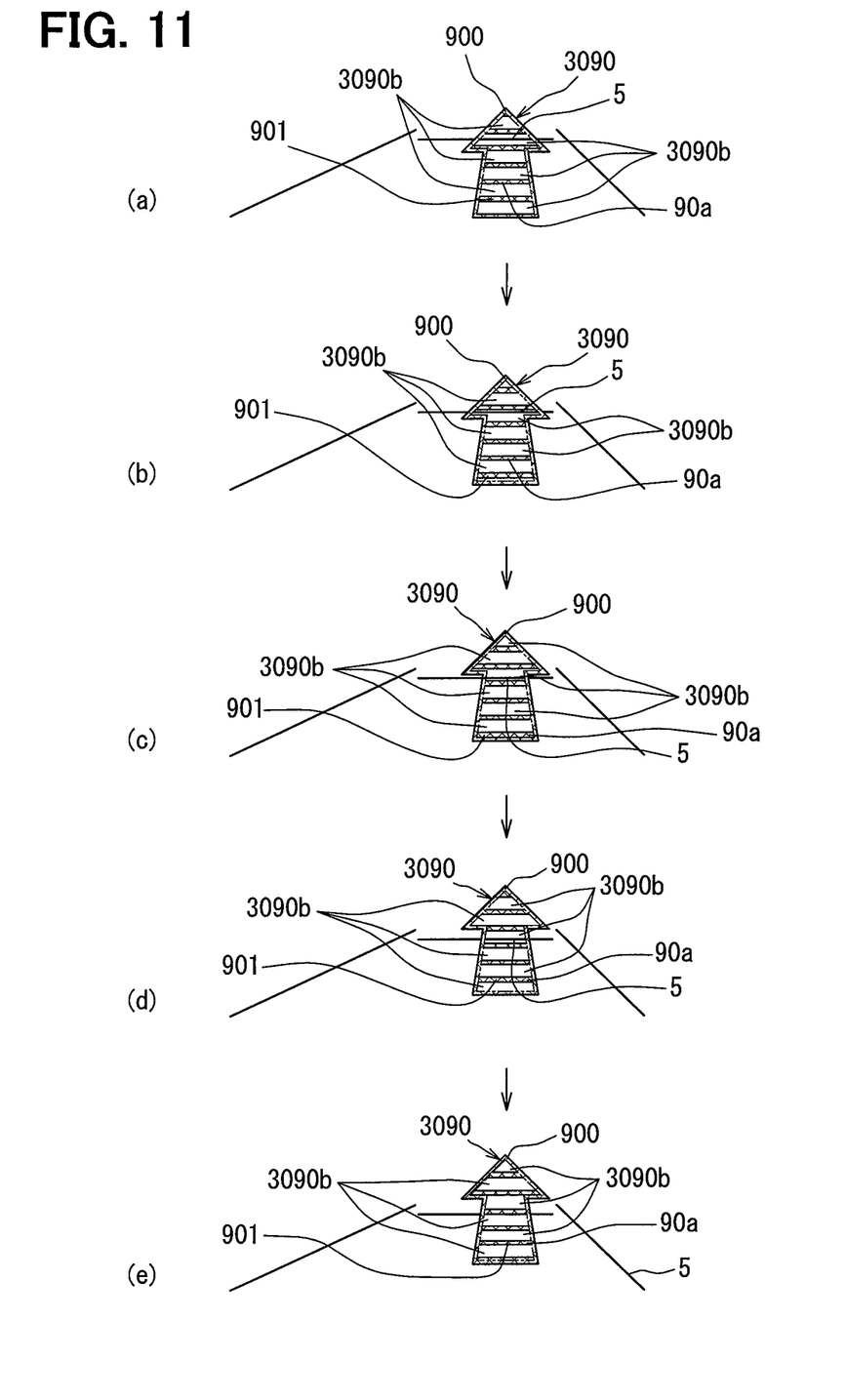

In Modification 3 relating to the first to fifth embodiments, the specific pixels 90b, 2090b, and 3090b in the notification images 90, 2090, 3090, 4090, and 5090 may be formed in shapes other than a square, for example, a rectangular shape shown in FIG. 11. Incidentally, FIG. 11 is representative of Modification 3 of the third embodiment.

As Modification 4 related to the second embodiment, a frame animation according to the third embodiment may be realized in combination. As Modification 5 related to the second embodiment, a frame animation according to one of the fourth and fifth embodiments may be realized in combination. As Modification 6 related to the third embodiment, a frame animation according to one of the fourth and fifth embodiments may also be realized in combination.

As Modification 7 related to the first to fifth embodiments, any one of the instrument information, the traffic sign information, the warning information, and the communication information exemplified in the first embodiment may be set as "specific information" notified by the notification images 90, 2090, 3090, 4090, and 5090. As Modification 8 related to the first to fifth embodiments, a light transmissive combiner disposed in the vehicle 2 on the side of the driver's seat 6 rather than the front windshield 4 may be a "projection member".

The head-up display device 1 according to the first disclosure described above projects the display image 9 onto the projection member 4 that transmits, in the vehicle 2, the external real image 5 to display the display image superimposed on the external real image for virtual image display visible to the occupant 7 in the vehicle. The head-up display device 1 includes the projection unit 10 and the display control unit. The projection unit 10 projects the notification image 90, 2090, 3090, 4090, or 5090 as the display image for notifying the occupant of the specific information onto the projection member. The display control unit serves as the display control unit 20 that controls the projection unit to adjust the virtual image display state of the display image and cut the virtual image display of the specific pixels 90b, 2090b, or 3090b forming the inner portion 901 inside the outer edge portion 900 in the notification image.

According to the first disclosure described above, in the notification image displayed as the virtual image superimposed on the external real image for the purpose of notifying the occupant in the vehicle of information, the virtual image display of the specific pixels forming the inside portion inside the outer edge portion is cut. As a result, in the notification image, the external real image is substantially transmitted as it is at the specific pixels where the virtual image display is cut in the inner portion, while a high-visibility contrast ratio to the external real image can be imparted to the outer edge portion and the inner portion except for the specific pixels. This makes it possible to ensure compatibility between the visibility of the external real image and the notification property of information by the notification image.

Also, according to the disclosed second disclosure, the display control unit causes the specific pixels to appear at the multiple places in the inner portion of the notification image.

According to the second disclosure described above, the specific pixels in which the virtual image display is cut appears at the multiple places in the inner portion of the notification image, as a result of which the number of places where the external real image is substantially transmitted as it is increases. Therefore, while ensuring the visibility of the external real image, the high-visibility contrast ratio to the external real image is imparted to the outer edge portion of the notification image and the inner portion except for the specific pixels to enable the notification property of information to be ensured.

The present disclosure has been described based on the embodiments; however, it is understood that this disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements is included to the various combinations or aspects, are included in the scope or the technical idea of the present disclosure.

What is claimed is:

1. A head-up display device configured to project a display image in a vehicle onto a projection member, which is configured to transmit an external real image, to display the display image superimposed on the external real image to indicate a virtual image visible to an occupant in the vehicle, the head-up display device comprising:
   a projection unit configured to project a notification image as the display image onto the projection member to notify the occupant of specific information; and
   a display control unit configured to control the projection unit to adjust a virtual image display state of the display image to cut specific pixels, which form an inner portion inside an outer edge portion of the notification image, in a virtual image display, wherein
   the display control unit is configured to cause entirety of normal pixels, which form the outer edge portion of the notification image, to remain in the virtual image display.

2. The head-up display device according to claim 1, wherein
   the display control unit is configured to cause the specific pixels to appear at a plurality of places in the inner portion of the notification image.

3. The head-up display device according to claim 2, wherein
   the display control unit is configured to arrange the plurality of places, at which the specific pixels appear, in a checkered pattern in the inner portion of the notification image.

4. The head-up display device according to claim 2, wherein
   the display control unit is configured to arrange the plurality of places, at which the specific pixels appear, at random in the inner portion of the notification image.

5. The head-up display device according to claim 4, wherein
   the display control unit is configured to set sizes of the plurality of places, at which the specific pixels appear, different from each other.

6. The head-up display device according to claim 1, wherein
   the display control unit is configured to displace, with time, the places, at which the specific pixels appear, in the inner portion of the notification image.

7. The head-up display device according to claim 1, wherein
   the display control unit is configured to repeat increasing and decreasing luminance of the virtual image display normal pixels forming the outer edge portion and the inner portion except for the specific pixels in the notification image.

8. The head-up display device according to claim 7, wherein
   the display control unit is configured to alternately switch the luminance of the virtual image display of the normal pixels between a normal luminance on a higher luminance side and a zero luminance on a lower luminance side than the normal luminance.

* * * * *